(No Model.)
J. S. COLE.
LIQUID MEASURE.
No. 350,810. Patented Oct. 12, 1886.
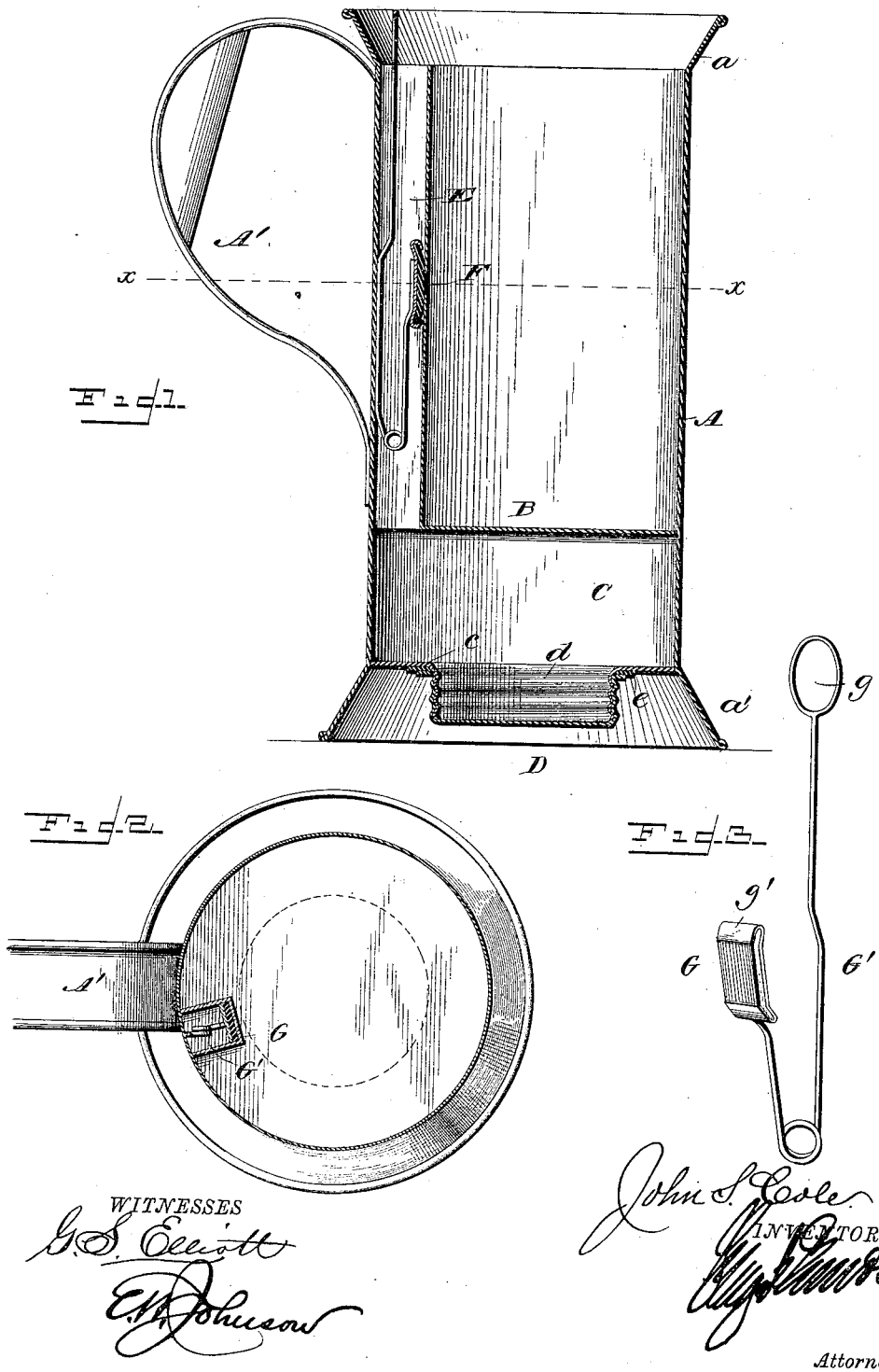

UNITED STATES PATENT OFFICE.

JOHN S. COLE, OF HOOKSET, NEW HAMPSHIRE.

LIQUID-MEASURE.

SPECIFICATION forming part of Letters Patent No. 350,810, dated October 12, 1886.

Application filed May 13, 1886. Serial No. 202,094. (No model.)

*To all whom it may concern:*

Be it known that I, JOHN S. COLE, a citizen of the United States of America, residing at Hookset, in the county of Merrimac and State of New Hampshire, have invented certain new and useful Improvements in Liquid-Measures; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain new and useful improvements in liquid-measures, the object of the same being to provide a convenient means for measuring liquid, whereby a single vessel may be employed for measuring different quantities.

In the accompanying drawings, Figure 1 is a sectional view of a measure constructed in accordance with my improvement. Fig. 2 is a transverse sectional view taken through the line $x\,x$ of Fig. 1, and Fig. 3 is a detail perspective view.

A refers to the body of the measuring-vessel, which is preferably cylindrical in cross-section, said measure being provided at its upper surface with a flanged rim, $a$, and at its bottom with a similar rim, $a'$, of a larger diameter than the body portion of the measure. A handle, A', of ordinary construction is attached to one side of the measure.

The interior of the vessel A is bisected or divided by a transverse partition, B, so as to provide between the upper part of the measure and the lower part a compartment, C, which is provided with a bottom plate, $c$, having a central opening with a depending screw-threaded flange, $d$, upon which screw-threaded flange is secured a cap, D, which, when screwed home, bears upon a rubber gasket, $e$. This cap can be readily removed, so that access can be had to the interior of the compartment C, either for the purpose of removing liquids therefrom or for cleaning the same.

E refers to a tube or passage-way which is attached to one side of the interior of the vessel adjacent to the handle, said tube extending from the compartment C to near the top of the vessel. This tube E is provided about centrally with an opening, F, which can be closed by means of a sliding stopper, G, which is attached to a spring-bar, G', the upper end thereof being formed into a handle, $g$. When the handle is grasped, the thumb or finger of the operator may be inserted in the loop of the rod, which carries a valve, so as to elevate the same and remove the valve from the opening F.

In measuring liquids, for instance, if the upper part of the receptacle contains two quarts and it is desired to measure off but a single quart, the measure may be then filled approximately one-half, and when the valve is raised the overplus of liquid will flow through the perforation into the bottom compartment, where it will remain until removed therefrom, either by taking off the cap D or tilting the receptacle, so that the contents thereof will flow through the tube or passage-way E.

This measuring device is especially adapted for measuring malt liquors; for instance, if it is desired to measure a quantity equal to the capacity of the lower half of the vessel, the vessel can be filled above the perforation F, and when the valve is elevated the overplus will flow in the lower receptacle. Thus the true measure can be given, while the upper half of the vessel may be filled with foam.

The valve G, hereinbefore referred to, consists, essentially, of a flexible piece of material, which is held in place by a metallic clip, $g'$, having opposite ends, the rear portion of said clip being secured to the stem of the spring-bar.

I claim—

1. In a portable measuring-vessel, a cylindrical body portion, A, provided with a transverse partition, B, which forms, with the body and bottom portions, a compartment, C, a tube or passage-way, E, which extends from the partition B to near the upper edge of the body portion, said tube being provided with an opening, F, which is located between the partition B and the upper edge of the tube, substantially as shown.

2. In a measuring device, a body portion or vessel, A, provided with a transverse portion, B, a tube or passage-way, E, extending upwardly therefrom, an opening in the wall of said passage-way, and a spring-bar located within the passage-way and provided with a stopper adapted to close said opening, the parts being combined substantially as shown, and for the purpose set forth.

3. In a measuring device, a receptacle, A, provided with a bottom having a screw-threaded cap, D, secured thereto, a transverse partition secured to the sides of the vessel above the bottom, and a tube or passage-way, E, secured above the bottom to the sides of the vessel, and provided with an opening, F, a spring-bar located within said passage-way, and provided with a stopper for closing the opening F, and the handle g, the parts being organized substantially as shown.

In testimony whereof I affix my signature in presence of two witnesses.

JOHN S. COLE.

Witnesses:
ANNA J. PRESCOTT,
IDA P. LIBBEY.